United States Patent [19]
Traina et al.

[11] Patent Number: 5,509,313
[45] Date of Patent: Apr. 23, 1996

[54] METHOD FOR MEASURING FLOW RATE AND DIRECTION OF A FLUID IN A CONDUIT

[75] Inventors: John E. Traina, Glenshaw; William G. Moul, Marshall Township, Allegheny County, both of Pa.

[73] Assignee: United Sciences, Inc., Gibsonia, Pa.

[21] Appl. No.: 315,558

[22] Filed: Sep. 30, 1994

[51] Int. Cl.⁶ .................................................. G01F 1/46
[52] U.S. Cl. .............................. 73/861.065; 73/861.067; 73/861.066
[58] Field of Search ........................... 73/861.65, 861.67, 73/861.66, 861.42

[56] References Cited

U.S. PATENT DOCUMENTS

| | | | |
|---|---|---|---|
| 2,706,409 | 4/1955 | Preston | 73/861.67 |
| 3,997,249 | 8/1976 | Wittig | 73/212 |
| 4,654,813 | 3/1987 | Edlund et al. | 364/571 |
| 5,209,258 | 5/1993 | Sharp et al. | 137/343 |
| 5,394,759 | 3/1995 | Traina | 73/861.67 |
| 5,440,217 | 8/1995 | Traina | 318/644 |

FOREIGN PATENT DOCUMENTS

| | | |
|---|---|---|
| 2231667 | 11/1990 | United Kingdom. |

OTHER PUBLICATIONS

Technisches Messen Tm, vol. 48, No. 6, Jun. 1981, Munchen De, pp. 229–232, J. Wachter, E. A., "Automatischer Nullabgleich for Stromungssonden".

Appendix A, Methods 1 and 2 of 40 Code of Federal Regulations, Part 60, Jul. 1, 1992.

Primary Examiner—Richard Chilcot
Assistant Examiner—Jewel V. Artis
Attorney, Agent, or Firm—Buchanan Ingersoll; Lynn J. Alstadt

[57] ABSTRACT

A method of measuring fluid flow through a conduit first finds a null position then rotates the probe 90° from the null position to be aligned with the true flow direction of the field. The null position is found by incremental movement of the probe through selected angles. At each position a differential pressure reading is taken. These readings are then compared to determine subsequent incremental movements to identify an approximate null position. The true null position is found from the approximate null by applying at least squares fit to differential pressure readings taken within a range, preferably +/−5°, around the approximate null. The probe is then rotated 90° from the null position. A plurality of differential pressure readings are taken and the square root of each such reading is found. An average of those square roots is multiplied by a predetermined constant to find the flow rate.

18 Claims, 4 Drawing Sheets

1

METHOD FOR MEASURING FLOW RATE AND DIRECTION OF A FLUID IN A CONDUIT

FIELD OF INVENTION

The invention relates to methods for measuring the true direction and flow rate of a fluid, particularly stack gases through a conduit which is useful for emissions monitoring.

BACKGROUND OF THE INVENTION

There are many situations in which there is a need or desire to measure the rate of flow of a liquid or gas through a conduit. Because of the shape of the conduit, temperature differentials within the conduit and other factors, not all of the fluid may be flowing parallel to a centerline through the conduit. Rather the true flow direction at any specific location may be, and frequently is, at some angle relative to the centerline. In these non-axial flow environments it is possible to place a flow monitoring probe parallel to the centerline and obtain a flow rate. But depending upon the angle of the true flow direction relative to the centerline, the flow rate determined parallel to the centerline may be higher or lower than the actual flow rate. Thus, there is a need for a method which can accurately determine the true flow direction of a fluid flowing through a conduit.

The federal government of the United States has set limits as to the amount of pollutants that an electric utility or other business may emit into the air. Typically, these emissions are determined from measurements of the flow rate of the stack gasses through the stack and an analysis of the of the stack gasses to determine the levels of pollutants which are present. If one knows the flow rate and has another monitor which measures the concentration of pollutants in a selected volume of fluid one can calculate the quantity of pollutants emitted over any selected time period.

The United States has additional regulatory requirements which now require many electric utilities to continuously measure emissions of specified pollutants on a mass per unit time basis. Additionally, the continuous monitors must be periodically tested to assure that they are functioning properly. When such tests are done one must use a second "reference method" monitoring device. If the reference method monitor shows the continuous monitor to be reading low, the continuous monitor must be recalibrated. Adoption of these rules has put a new importance upon the errors which occur both in continuous monitoring and in the periodic reference method verification tests. Such errors can be very costly to both the supplier of the monitor and the utility. The supplier is affected because the reference method can erroneously indicate that the monitor is not meeting the performance guarantee. The utility is affected because it may have been reporting the emission of more pollutants than actually occurred. The new regulations establish monetary value in the form of trading credits to a measured ton of $SO_2$ emissions. If the reference method is in error, that error will directly cause an enormous high or low use of the utility's $SO_2$ allowance and $SO_2$ trading credits. The value of such emissions is such that for large utilities as much as $1,000,000 per percent error in measured emissions may result.

In performing the required reference method verification tests the technician typically uses a type S (also called S-type) pitot tube made to specific dimensions. At each point the tester measures a differential pressure. The static pressure is taken at selected points. The differential pressure reading is then used to compute flow rate.

2

The test technician frequently assumes that the direction of flow rate of a fluid in a stack is along a centerline through the stack. Consequently, he orients the pitot tube parallel to the centerline to take his readings. However, in many, if not all, smokestacks the true direction of fluid flow usually is at some angle relative to the centerline. Further, this angle will in general be different at different measurement points. To obtain more accurate flow measurements the pitot tube should be oriented along the true flow direction.

Prior to the present method there has been no precise technique for finding true flow direction. Technicians who have attempted to find true flow direction have normally oriented the pitot tube in various positions, taken differential pressure readings and then used those readings to estimate the true flow direction.

Some technicians have attempted to determine the true flow direction by first finding a probe orientation where the differential pressure is zero. Such a direction is known as the null position. Once the null position is found the pitot tube is rotated 90° from this position to the true flow direction. Attempts to find the null position have also been imprecise. Usually the null position is assumed to be half way between two consecutive positions which provide pressure readings of opposite sign.

After the technician has oriented the pitot tube at the measurement point he takes several readings at that point. Conventionally, the technician averages the pressure readings and then takes the square root of that average as the velocity or flow rate of the gas through the measurement point.

We have found that the techniques currently being used to position the pitot tube and the averaging technique used to compute flow rate are prone to error. Consequently, there is a need for a more reliable and more accurate method to measure true flow rate of a fluid through a conduit.

SUMMARY OF THE INVENTION

An S-type pitot tube is placed at the selected measurement point and oriented along an axis, typically perpendicular to the centerline of the conduit. A first pressure reading is taken. Then the pitot tube is rotated through a selected angle and a second pressure reading is taken. The readings are compared to determine if a change in sign has occurred. If not, the probe is rotated in the same direction through the same angle, another pressure reading is taken and the two most recent pressure readings are compared. This process is repeated until a change of sign occurs. When a change of sign is seen, the probe is rotated in an opposite direction through a new, smaller angle, a pressure reading is taken and the most recent pressure readings are compared. The process is repeated until the two most recently taken pressure readings have opposite signs and the new selected angle is less than one degree or one differential pressure reading is zero. Then, an approximate null has been found.

Next, the S-type pitot tube is rotated in one half degree increments through a range of plus 5° and minus 5° from the approximate null. At each incremental position an increment position pressure reading is taken and recorded with a corresponding probe angle. A statistical correlation technique using the measured angle and pressure differential is performed to find the most probable angle at which the differential pressure changes sign. This data preferably is fitted into a linear equation using the least squares method with the incremental position pressure readings as dependent variables and the corresponding probe angles as the independent variables. Solution of the equation determines a predicted zero crossing angle. If the predicted zero crossing angle is within a predetermined range, the predicted zero crossing angle is the true null angle. If the predicted zero crossing is outside of that range the previous steps are repeated. The S-type pitot tube is rotated through a selected angle to a new approximate null and readings are taken to reapply the linear equation until a true null is found.

A direction of 90° from the true null toward the nominal flow direction is the true flow direction at the measurement point assuming pitch is negligible. The pitot tube is rotated 90° from the true null position to be aligned with the measured true flow direction. Several differential pressure readings are taken. Then the flow rate along the flow direction found by this method is calculated by taking an average of the square roots of each of the differential pressure readings. Assuming pitch is negligible, this flow rate can be converted to the flow rate in the nominal direction by multiplying the true flow rate times the cosine of the angle between the nominal flow direction and the flow direction found using this method.

DESCRIPTION OF THE PREFERRED EMBODIMENTS

Figure 1:
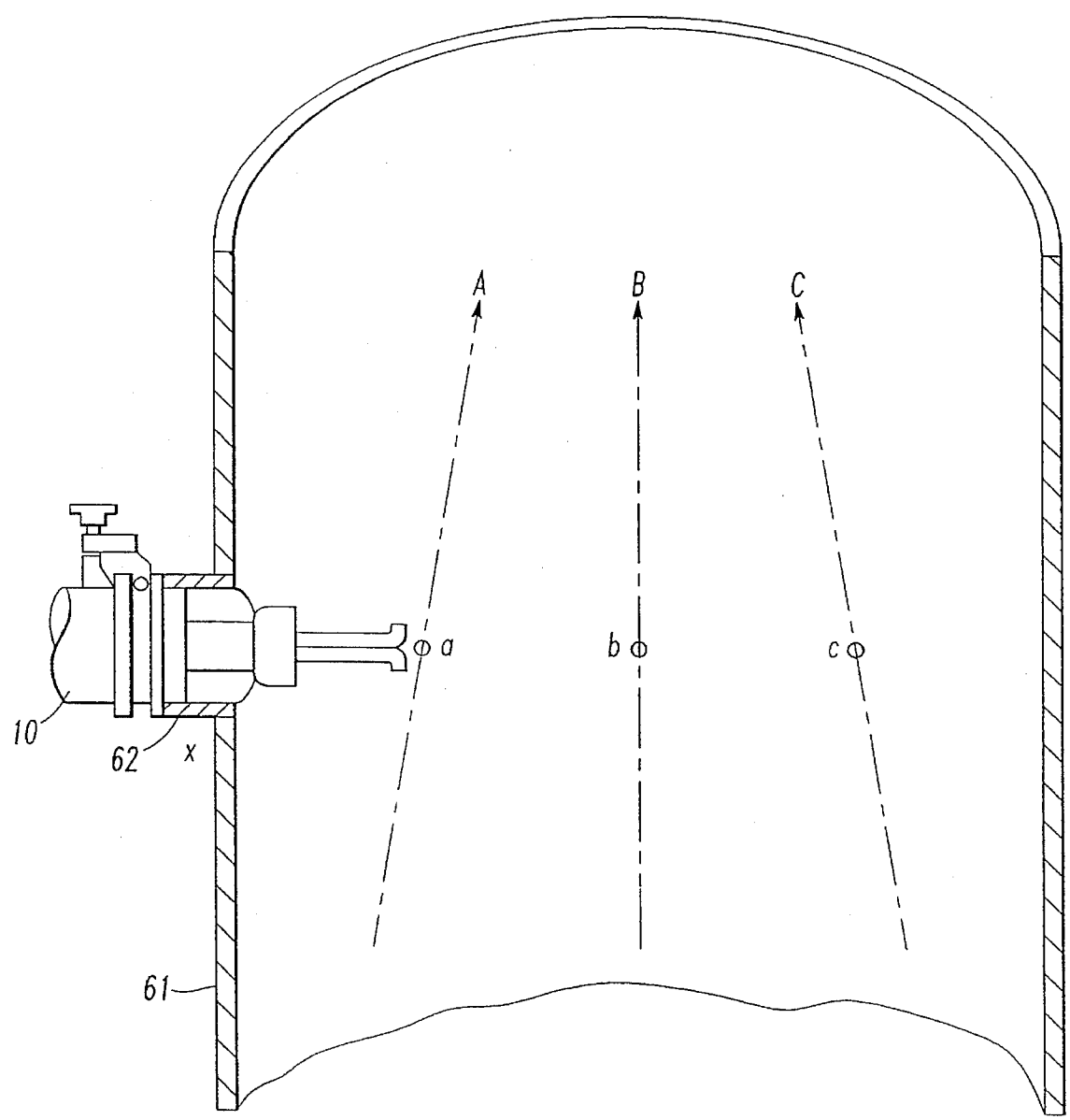
FIG. 1 is a perspective view of a section of a stack in which emission readings are to be taken.
Figure 2:
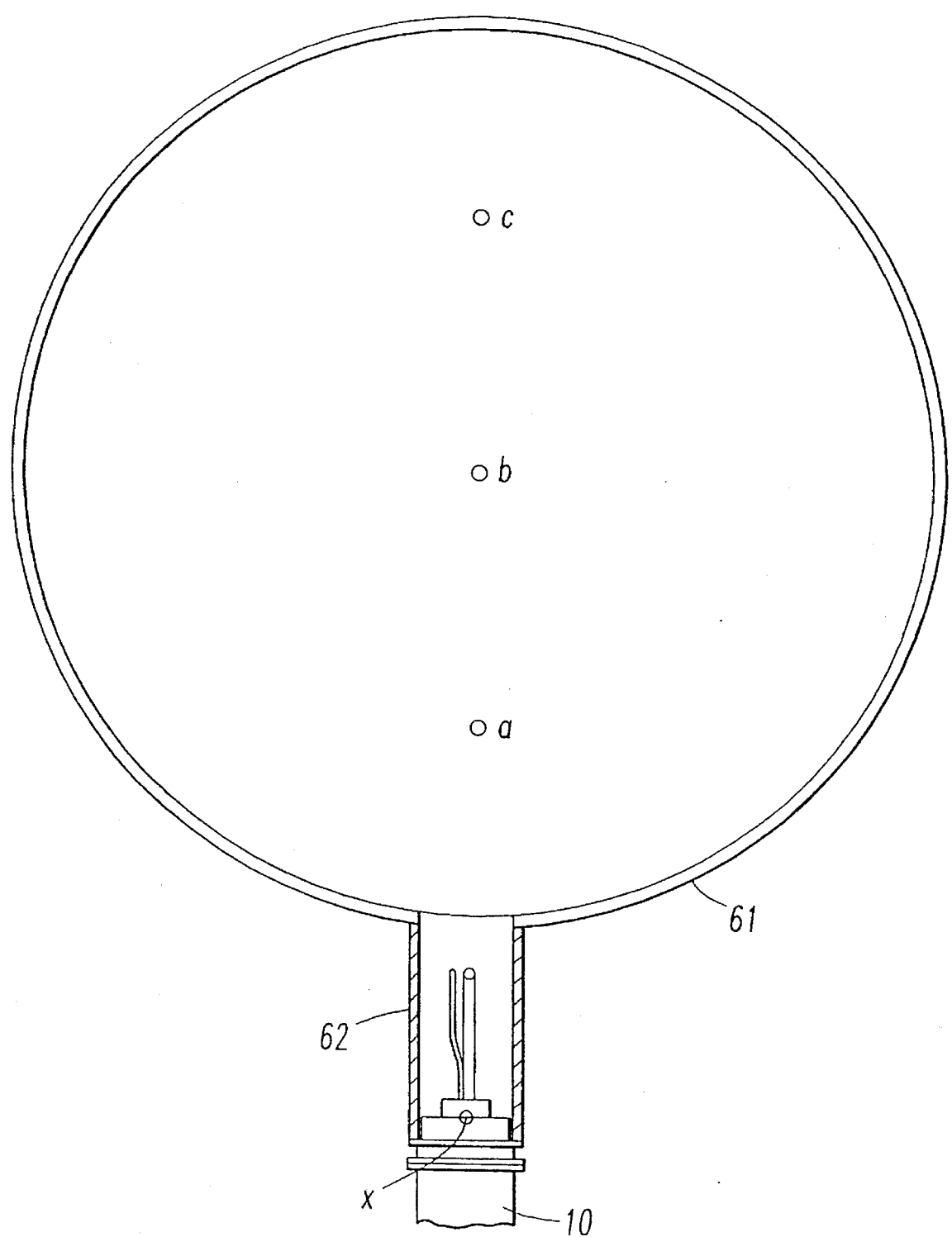
FIG. 2 is a top plan view of the stack shown in FIG. 1.

The present method can best be understood in the context of a sampling probe being used in a smokestack such as is illustrated by the diagram of FIGS. 1 and 2. A probe assembly 10 is mounted to a port 62 in a stack 61 in which emissions monitoring is performed. The probe assembly is held on the stack 61 by a clamp 3 which attaches the probe assembly to the stack at point x. I prefer to construct the end of the probe assembly 10 and port 62 to have a slot and key arrangement so that the probe will always be at the same orientation relative to the stack when it is attached to the port. Consequently, the pitot tube will be initially oriented to be aligned with a line parallel to a centerline through the conduit. That centerline corresponds to vector B in FIG. 1. For purposes of the present method and in accordance with the practice in the art, vector B is considered the nominal flow direction.

Assume that the test method requires readings to be taken at points a, b and c where vectors A, B and C pass through plane P. At any given point the true flow direction will have three components, a vertical component, a yaw component and a pitch component. The vertical component is parallel to a centerline through the conduit and corresponds to positive movement along the y axis in the diagrams of FIGS. 3 thru 8. The yaw component is movement in a direction left or right relative to a person looking into the stack from the port 62. This direction is represented by the x axis in FIGS. 3 thru 8. The pitch component is movement in a direction forward or away from a person looking through the port. This direction would be represented by a z axis not shown in the drawings.

The type of testing performed by the probe used for the present method is almost always done several diameters away from any disturbance in the conduit. Consequently, any pitch which has been created by the disturbance is significantly damped before it reaches the test area and usually is minimal.

The probe illustrated in FIGS. 1 and 2 is not configured to measure flow in the pitch direction unless the probe is moved 90° around the stack and advanced to the same point. However, since the flow component in the yaw direction is almost always substantially greater than the pitch component the relative contribution of the pitch component to the true flow direction is very small. Hence, the pitch component can be usually ignored and is ignored in the present method. For purposes of the present description we will use the phrase "measured true flow direction" to mean the actual flow direction of the fluid in the conduit as measured using the present method which does not consider pitch.

The true flow direction may be different at different points in the same plane as indicated by the vectors A, B and C in FIG. 1. After the probe is properly mounted, the tip of the probe is advanced to the first selected sampling point. At each point the probe must be rotated to find the true flow direction. Then a series of differential pressure readings are taken along the true flow direction and the flow rate of the fluid in that true flow direction is calculated.

Whenever the S-type pitot tube is oriented to have a zero pressure differential between its two opposite openings the pitot tube is said to be at a null position or null angle. Once the null angle is found, the true flow direction can be assumed to be 90° away provided the pitch component is negligible. The present method is used to find the null angle in the yaw direction. The measured true flow direction is then the null angle plus or minus 90°.

Figure 3:
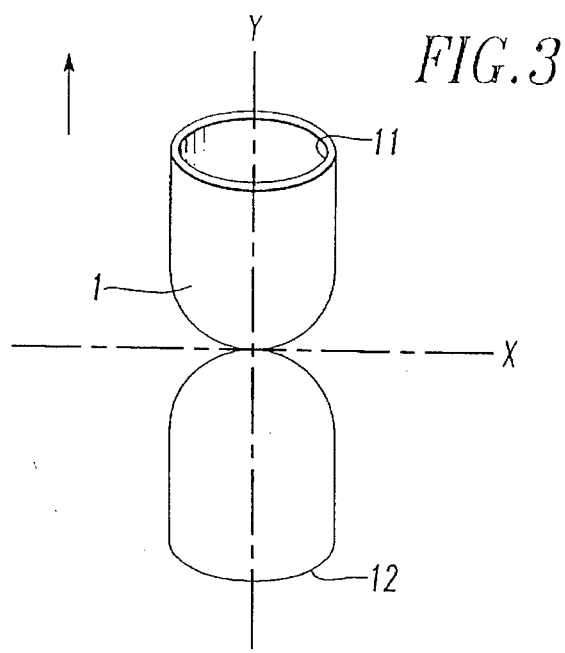
FIGS. 3 thru 7 are diagrams illustrating a sequence of movements of the probe made to find the null.
Figure 5:
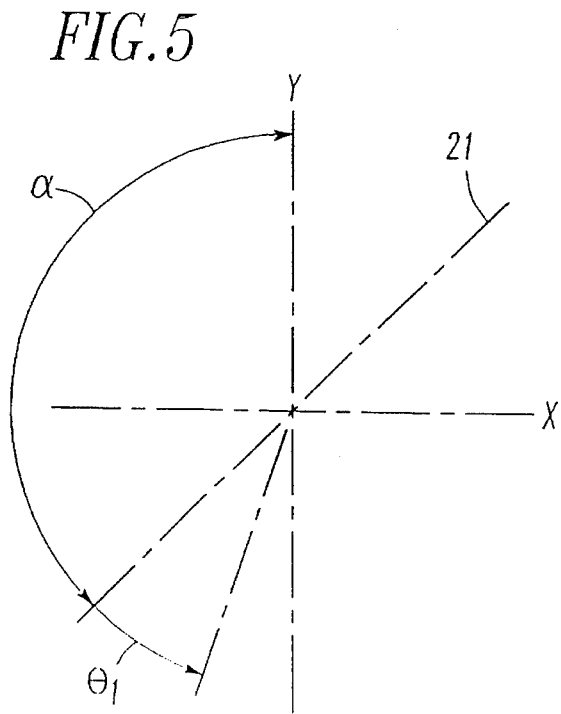
Figure 6:
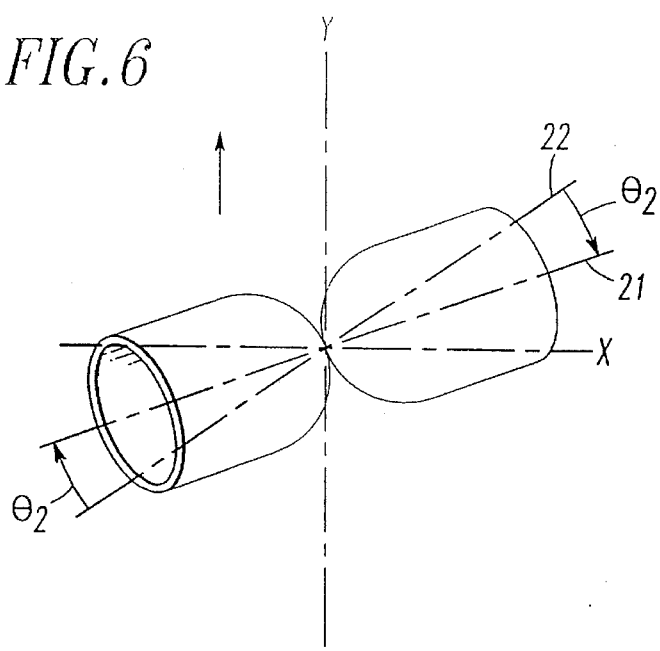
Figure 7:
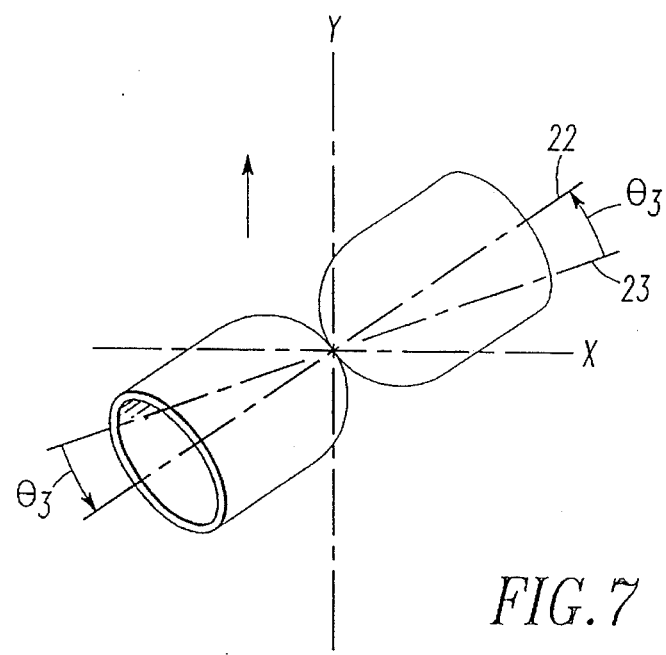
Figure 8:
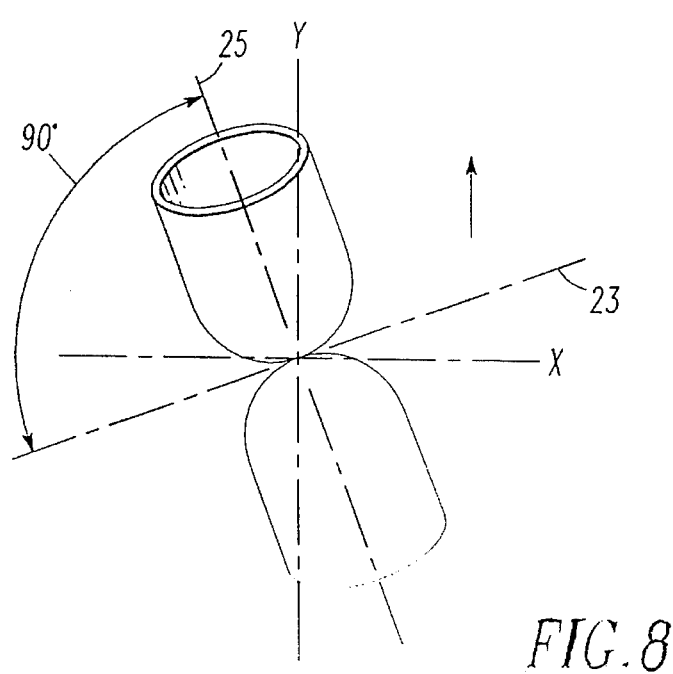
FIG. 8 is a diagram showing the probe having been moved from the true null position to be aligned with the true flow direction.

FIGS. 3 thru 7 illustrate the movement of the pitot tube 1 in accordance with the present invention from the initial position shown in FIG. 3 to the null position of FIG. 7. Then the pitot tube is rotated 90° to the true flow direction shown in FIG. 8. In these figures an x, y coordinate axis is shown as a reference. The y axis also corresponds to a nominal flow direction through the conduit and the vertical component of the fluid flow. The x-axis corresponds to the yaw direction.

The present method is performed in two stages. The first stage involves taking a series of differential pressure readings using various orientations of the pitot tube. The second stage is the linear fit.

Stage 1

1) The method begins by advancing the pitot tube to a selected measurement point such as points a, b or c shown in FIGS. 1 and 2. Initially, the pitot tube is oriented along the nominal flow direction in the conduit. Typically, this will be a vertical orientation shown by the arrow in FIG. 3. At this position a differential pressure reading $P_1$ is taken. $P_1$ is the difference in pressure between the two openings 11 and 12 of the pitot tube 1. The pressures are read by a gauge (not shown) to which the pitot tube is connected.

Figure 4:
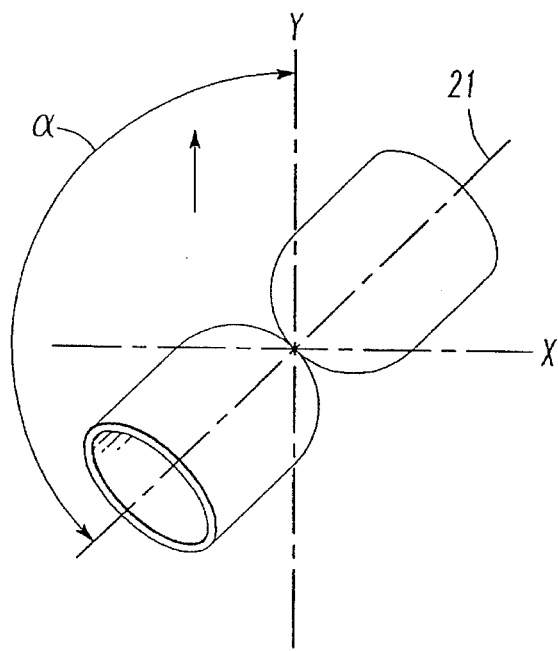

2) Next we select an angle $\alpha$ through which the probe will be moved and rotate the pitot tube through the angle. This generally is about 110° from the nominal flow direction. Movement of the pitot tube through the selected angle $\alpha$ is illustrated in FIG. 4. After being so moved, a centerline through the pitot tube indicated by chain line 21 will be at an angle of $\alpha$ from the initial position of a centerline through the pitot tube which corresponds to the y-axis. At that position we take a second pressure reading, call it $P_2$. Then, $P_1$ and $P_2$ are compared. If the sign of $P_2$ differs from the sign of $P_1$ then we assume that the pitot tube has passed through null position. If the signs are the same, we assume that the null position has not yet been passed.

3) Next we select a new angle of rotation $\theta_1$ and rotate the probe toward the null position. Usually, this initial angle is about four or five degrees. Then, we take another pressure reading $P_3$ and compare that reading to the previous reading. If no change of sign has occurred, we repeat the process moving the probe in the same direction until a change of sign is observed. This is illustrated in FIG. 5. When a change of sign is seen we select a new, smaller angle $\theta_2$ and repeat the process until the smaller angle is less than 1 degree, then an approximate null has been found.

4) FIG. 6 and 7 illustrates movement of the probe after a change in sign has been observed between the previous two pressure readings and the increment through which the probe has been moved is greater than 1 degree. We have changed the sign of the increment $\theta_1$, halved the increment (e.g. from 10° to 5°), and rotated the pitot tube through the angle $\theta_2$. As shown in FIG. 6, the pitot tube 1 is positioned to have a centerline indicated by chain line 22 which is plus $\theta_2$ degrees from the previous position of the pitot tube indicated by chain line 21. After the pitot tube has been rotated to the new position of FIG. 6, we take another differential pressure reading.

5) If the sign of that pressure reading differs from the sign of the previous pressure reading, we assume that the pitot tube has passed through the null position. Consequently, we must repeat the procedure. That is, we would halve $\theta_2$ and change its sign to make $\theta_3$. Then, we would rotate the pitot tube $\theta_3$ as shown in FIG. 7. Now a center line through the pitot tube indicated by chain line 23 is $\theta_3$ degrees from the previous position of the pitot tube indicated by chainline 22. At that position take another pressure reading.

The process continues until the angle of rotation is less than a predetermined increment, preferably one degree, and the signs of the two most recent pressure readings are opposite. Then, the appropriate null will be found.

6) Sometimes the search may start in the wrong direction. That will be indicated by increasing pressure differential absolute values; that is if $|P_3|>|P_2|$ and $|P_2|>|P_1|$. Should that occur, change the sign of the "increment" $\theta_i$, replace $P_1$ with $P_3$, move the pitot tube by the new increment $\theta_i$, and take a reading $P_4$. If the sign of $P_4$ differs from the sign of $P_3$, then repeat the method beginning at paragraph 3 replacing $P_2$ with $P_4$.

7) The stack measurement conditions create a lot of "noise" in the measurements caused by buffering, flow variation, probe bounce and other factors. When we have a situation with a $P_4>P_3>P_2>P_1$, then one or two things have happened: a) we started off in the wrong direction but the first three points because of "noise" were not $P_3>P_2>P_1$, or b) we were fooled by a "noisy" sign change into changing direction when we should not have. If that occurs we reverse the direction of rotation of the pitot tube; take the next pressure differential reading; make a comparison to the previous differential pressure reading; and proceed as described in paragraph 3.

Stage 2

As previously stated an approximate null has been found when two consecutive differential pressure readings differs in sign and the increment of movement between the readings was less than one degree. An approximate null is also found whenever the differential pressure reading is zero which seldom happens. When an approximate null has been found it is time to perform stage 2, the statistical correlation.

This stage begins by positioning the probe at the detected zero position or half way between the position of where the two consecutive differential pressure readings were taken.

Next the pitot tube is moved in half degree steps to positions along an arc from −5° to +5° around that starting position. At each position a differential pressure reading and probe angle are recorded.

The probe angle and differential pressure readings are applied to a statistical correlation technique to determine the most probable angle at which the differential pressure changes sign. We prefer to use a linear fit techinque. Using the pressure as a dependent variable and probe angle as the independent variable the least squares method is used to fit a linear equation. That equation is then solved to determine a predicted zero crossing probe angle. If that angle is within the +/−5 degree range of the previous paragraph, that zero crossing is the null angle. If the predicted zero crossing angle is outside the +/−5° range, the probe is moved approximately 2½ toward the null and stage 2 is repeated. Do this up to five times, or until a total of about 10 minutes. If no zero crossing is found abort the search because the method will not be useful for the particular test environment.

Having found the null angle, the true flow direction assuming pitch is negligible is 90° from the null angle. Accordingly, the pitot tube is rotated 90° and to the measured true flow direction which corresponds to chain line 25 shown in FIG. 8. At that position several differential pressure readings are taken. Then the readings are used to calculate the flow rate.

It is well known that the flow rate $F_v$ is related to differential pressure according to the formula $$F_v = k\sqrt{P}$$

where k is a function of the composition and temperature of the fluid being measured, the pitot coefficient and the absolute static pressure. Consequently, the art has conventionally taken several pressure readings at each point, averaged their readings and taken the square root of the average. Thus, $$F_v = k\sqrt{\frac{P_1+P_2+P_3+\ldots+P_n}{n}}$$

However, we have found that a more accurate result can be obtained by taking the square root of each reading and then averaging that result. Thus $$F_v = k\frac{\sqrt{P_1}+\sqrt{P_2}+\sqrt{P_3}+\ldots+\sqrt{P_n}}{n}$$

After the measured true flow direction and flow velocity has been found at a given point, it is necessary to determine the flow in the nominal direction through the stack. This is easily calculated by multiplying the flow in the true flow direction by the cosine of the angle between the nominal flow direction and the true flow direction. To calculate the total flow out the stack one can simply take an average of the calculated flows in the nominal flow direction at all of the measurement points.

Using the methods described here for finding the null and calculating flow rate is much more accurate than the methods used in the past. Consequently, calculations of pollution emissions from flow rates determined with this method are more accurate. Hence, accurate flow rates can result in better process control and substantial savings for utilities and others who must monitor emissions.

Although we have described and shown certain present preferred embodiments of our invention, it should be distinctly understood that the invention is not limited thereto, but may be variously embodied within the scope of the following claims.

We claim:

1. A method for finding true flow direction ignoring pitch at a measurement point of a fluid flowing in a known nominal direction through a conduit comprising the steps of:

a. placing an S-type pitot tube at the measurement point;
   b. orienting the S-type pitot tube along a selected axis through the conduit;
   c. taking a first pressure reading $p_1$;
   d. rotating the S-type pitot tube through a selected rotation increment angle to a new angle;
   e. taking a second pressure reading $p_2$ at the new angle;
   f. comparing the two just-taken pressure readings to determine whether an approximate null has been found;
   g. if no approximate null has been found, choosing a new selected angle, rotating the S-type pitot tube through a rotation increment angle to the new selected angle and taking a pressure reading $p_3$;
   h. comparing the most recently taken pressure readings;
   i. if the two most recently taken pressure readings have opposite signs and the new selected rotation increment angle is less than one degree then an approximate null has been found, but if no approximate null has been found repeating steps g, h and i until an approximate null is found;
   j. when an approximate null has been found, rotating the S-type pitot tube in selected increments through a range about the approximate null and at each incremental position, taking an incremental position pressure reading and recording the incremental position pressure reading and a corresponding probe angle;
   k. performing a statistical correlation using pressure readings and probe angles to determine a most probable probe angle at which the differential pressure changes sign;
   l. determining a predicted zero crossing angle from the statistical correlation;
   m. if the predicted zero crossing angle is within the range of step j, use the predicted zero crossing angle as the true null angle;
   n. if the predicted zero crossing is outside of the range of step i, rotating the S-type pitot tube through a selected angle to a new approximate null and repeating steps i through l using the new approximate null until a true null is found; and
   o. assigning a direction 90° from the true null toward the nominal flow direction as the true flow direction ignoring pitch at the measurement point.

2. The method of claim 1 wherein the method is performed using a probe having a mechanical stop which defines the selected axis along which the S-type pitot tube is initially oriented.

3. The method of claim 1 wherein the selected angle is not greater than 10°.

4. The method of claim 1 wherein step f is comprised of the step of concluding that an approximate null has been found if the two just-taken pressure readings have opposite signs and the selected angle is less than one degree.

5. The method of claim 1 wherein step f is comprised of the step of concluding that a null has not been found if the two just-taken pressure readings have opposite signs and the selected angle is greater than one degree.

6. The method of claim 1 wherein the two just-taken pressure readings of step f do not have opposite signs and step f is comprised of the step of concluding that a null has not been found.

7. The method of claim 1 wherein the new selected angle is determined by halving the selected angle and changing its sign.

8. The method of claim 1 wherein the range of step j is from +5° to −5°.

9. The method of claim 1 wherein the selected increments of step j are one-half degree increments.

10. The method of claim 1 wherein one differential pressure reading is found to be zero and the position at which that differential pressure reading occurs is determined to be an approximate null.

11. The method of claim 1 wherein each new selected angle of step g is smaller than a previously selected angle.

12. A method for measuring flow rate at a measurement point of a fluid flowing in a known nominal direction through a conduit comprising the steps of:

a. placing an S-type pitot tube at the measurement point;
   b. orienting the S-type pitot tube along a selected axis through the conduit;
   c. taking a first pressure reading $p_1$;
   d. rotating the S-type pitot tube through a selected rotation increment angle to a new angle;
   e. taking a second pressure reading $p_2$ at the new angle;
   f. comparing the two just-taken pressure readings to determine whether an approximate null has been found;
   g. if no approximate null has been found, choosing a new selected angle, rotating the S-type pitot tube through a rotation increment angle to the new selected angle and taking a pressure reading $p_3$;
   h. comparing the most recently taken pressure readings;
   i. if the two most recently taken pressure readings have opposite signs and the new selected rotation increment angle is less than one degree then an approximate null has been found, but if no approximate null has been found repeating steps g, h and i until an approximate null is found;
   j. when an approximate null has been found, rotating the S-type pitot tube in selected increments through a range about the approximate null and at each incremental position, taking an incremental position pressure reading and recording the incremental position pressure reading and a corresponding probe angle;
   k. performing a statistical correlation using pressure readings and probe angles to determine a most probable probe angle at which the differential pressure changes sign;
   l. determining a predicted zero crossing angle from the statistical correlation;
   m. if the predicted zero crossing angle is within the range of step j, use the predicted zero crossing angle as the true null angle;
   n. if the predicted zero crossing is outside of the range of step i, rotating the S-type pitot tube through a selected angle to a new approximate null and repeating steps i through l using the new approximate null until a true null is found;

o. assigning a direction 90° from the true null toward the nominal flow direction as the true flow direction at the measurement point;

p. positioning the S-type pitot tube at the null;

q. rotating the S-type pitot tube 90°;

r. measuring a differential pressure; and s. computing the true flow rate ignoring pitch from the measured differential pressure.

13. The method of claim 12 wherein flow rate is computed by taking a plurality of pressure readings at the measurement point, taking a square root of each pressure reading and averaging those square roots.

14. The method of claim 12 also comprising the step of determining a flow rate of the fluid in the nominal direction at the measurement point by multiplying the true flow rate times a cosine of an angle between the nominal flow direction and the true flow direction.

15. The method of claim 14 also comprising the steps of determining a flow rate of the fluid in the nominal direction of at least one other measurement point and averaging all such flow rates from the measurement points to determine a total flow rate of fluid through the conduit.

16. A method of determining flow rate of a fluid through a measurement point comprising the steps of:

a. placing at the measurement point a probe capable of measuring differential pressure at the measurement point;

b. taking a plurality of differential pressure readings at the measurement point with the probe;

c. taking a square root of each pressure reading;

d. averaging the square roots found in step c to create an average value; and e. multiplying the average value by a preselected constant.

17. The method of claim 1 wherein the statistical correlation is fitting a linear equation using the least squares method with the incremental position pressure readings as dependent variables and the corresponding probe angles as the independent variables.

18. The method of claim 12 wherein the statistical correlation is fitting a linear equation using the least squares method with the incremental position pressure readings as dependent variables and the corresponding probe angles as the independent variables.

* * * * *